US012724399B2

(12) United States Patent
Gu et al.

(10) Patent No.: US 12,724,399 B2
(45) Date of Patent: Sep. 1, 2026

(54) PROGRAM CREATION DEVICE

(71) Applicant: FANUC CORPORATION, Yamanashi (JP)

(72) Inventors: Yihua Gu, Yamanashi (JP); Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 363 days.

(21) Appl. No.: 18/553,184

(22) PCT Filed: May 31, 2021

(86) PCT No.: PCT/JP2021/020746
§ 371 (c)(1),
(2) Date: Sep. 28, 2023

(87) PCT Pub. No.: WO2022/254551
PCT Pub. Date: Dec. 8, 2022

(65) Prior Publication Data

US 2024/0184266 A1 Jun. 6, 2024

(51) Int. Cl.
*G05B 19/4093* (2006.01)
*G05B 19/402* (2006.01)

(52) U.S. Cl.
CPC ..... *G05B 19/40938* (2013.01); *G05B 19/402* (2013.01); *G05B 19/40932* (2013.01);
(Continued)

(58) Field of Classification Search
CPC ............ G05B 19/40938; G05B 19/402; G05B 19/40932; G05B 19/40935;
(Continued)

(56) References Cited

U.S. PATENT DOCUMENTS

2016/0151913 A1* 6/2016 Nagatsuka ............. B25J 9/1664 700/254
2018/0210434 A1* 7/2018 Iwatake ............... G05B 19/423

FOREIGN PATENT DOCUMENTS

CN 108176897 A 6/2018
JP H05-31659 A 2/1993
(Continued)

OTHER PUBLICATIONS

International Search Report issued in PCT/JP2021/020746; mailed Aug. 17, 2021.

*Primary Examiner* — Charles Cai
(74) *Attorney, Agent, or Firm* — Studebaker Brackett PLLC

(57) ABSTRACT

Provided is a program creation device capable of creating an operation program for a robot for removal machining of a workpiece even when a sufficient amount of displacement does not exist between a machined surface and a reference surface of the workpiece or even when the amount of displacement changes. The present disclosure pertains to a program creation device for creating an operating program for a robot for removal machining a workpiece having a machining surface, and a reference surface displaced from the machining surface. The robot for removal machining comprises a removal machining tool. The program creation device comprises: a positional information acquisition unit for acquiring positional information about a positional relationship between the machining surface and the reference surface of the workpiece; a tool information storage unit for storing tool information about the removal machining tool; and a program creation unit for creating, on the basis of the positional information about the workpiece and the tool information about the removal machining tool, the operating program for the robot for removal machining. The program creation unit selects a portion to be used of the removal
(Continued)

machining tool so as to avoid interference between the removal machining tool and the reference surface of the workpiece.

5 Claims, 13 Drawing Sheets

(52) U.S. Cl.
CPC .................. *G05B 19/40935* (2013.01); *G05B 2219/37555* (2013.01); *G05B 2219/45151* (2013.01)

(58) Field of Classification Search
CPC . G05B 2219/37555; G05B 2219/45151; B25J 11/006; B25J 13/085; B25J 19/023; B25J 9/1656; Y02P 90/02
See application file for complete search history.

(56) References Cited

FOREIGN PATENT DOCUMENTS

| | | | | |
|---|---|---|---|---|
| JP | 2000075914 | A | * | 3/2000 |
| JP | 2009-175954 | A | | 8/2009 |
| JP | 2010182210 | A | * | 8/2010 |
| JP | 2015-134407 | A | | 7/2015 |
| JP | 2016-101644 | A | | 6/2016 |
| JP | 2020-019126 | A | | 2/2020 |

* cited by examiner 1
10
ROBOT CONTROL DEVICE
11
ROBOT CONTROL UNIT
20
PROGRAM CREATION DEVICE
12
POSITION INFORMATION ACQUISITION UNIT
13
TOOL INFORMATION RETENTION UNIT
14
PRESSING FORCE ACQUISITION UNIT
15
ADVANCING SPEED ACQUISITION UNIT
16
PROGRAM CREATION UNIT
2
3
4
W11
W12
W13
W14
W1

PROGRAM CREATION DEVICE

TECHNICAL FIELD

The present disclosure relates to a program creation device, and more specifically, to a program creation device for creating an operation program for a robot for removal machining such as deburring.

BACKGROUND ART

Conventionally, in a deburring process by a robot, a ridge line serving as a deburring area is detected using a visual sensor to generate a deburring path. Deburring is performed by moving a deburring tool along the deburring path.

In such a deburring process by a robot, if a sufficient amount of displacement (for example, a level difference) exists between the machined surface of a workpiece and the reference surface (for example, a casting surface) displaced from the machined surface, deburring can be performed smoothly without interference such as contact between a deburring tool and the reference surface of the workpiece during deburring (for example, see Patent Document 1).

Patent Document 1: Japanese Unexamined Patent Application, Publication No. 2009-175954

DISCLOSURE OF THE INVENTION

Problems to be Solved by the Invention

However, depending on the positional relationship, such as when a sufficient amount of displacement does not exist between the machined surface and the reference surface of the workpiece, or when the amount of displacement changes, the deburring tool may come into contact with the reference surface and damage the reference surface during the deburring. When the pose of the deburring tool does not match the shape of the workpiece, a part of the ridge line serving as the deburring area may not be deburred. The same is true for removal machining other than deburring.

Means for Solving the Problems

The present disclosure relates to a program creation device for creating an operation program for a robot for removal machining of a workpiece having a machined surface and a reference surface displaced from the machined surface. The robot for removal machining includes a removal machining tool. The program creation device includes a position information acquisition unit configured to acquire position information relating to a positional relationship between the machined surface and the reference surface of the workpiece, a tool information retention unit configured to retain tool information relating to the removal machining tool, and a program creation unit configured to create the operation program for the robot for removal machining based on the position information of the workpiece and the tool information of the removal machining tool. The program creation unit is configured to select a use part of the removal machining tool so as to avoid interference between the removal machining tool and the reference surface of the workpiece.

Effects of the Invention

According to the present disclosure, it is possible to create an operation program for a robot for removal machining of a workpiece even when a sufficient amount of displacement does not exist between a machined surface and a reference surface of the workpiece or even when the amount of displacement changes.

PREFERRED MODE FOR CARRYING OUT THE INVENTION

Figure 1:
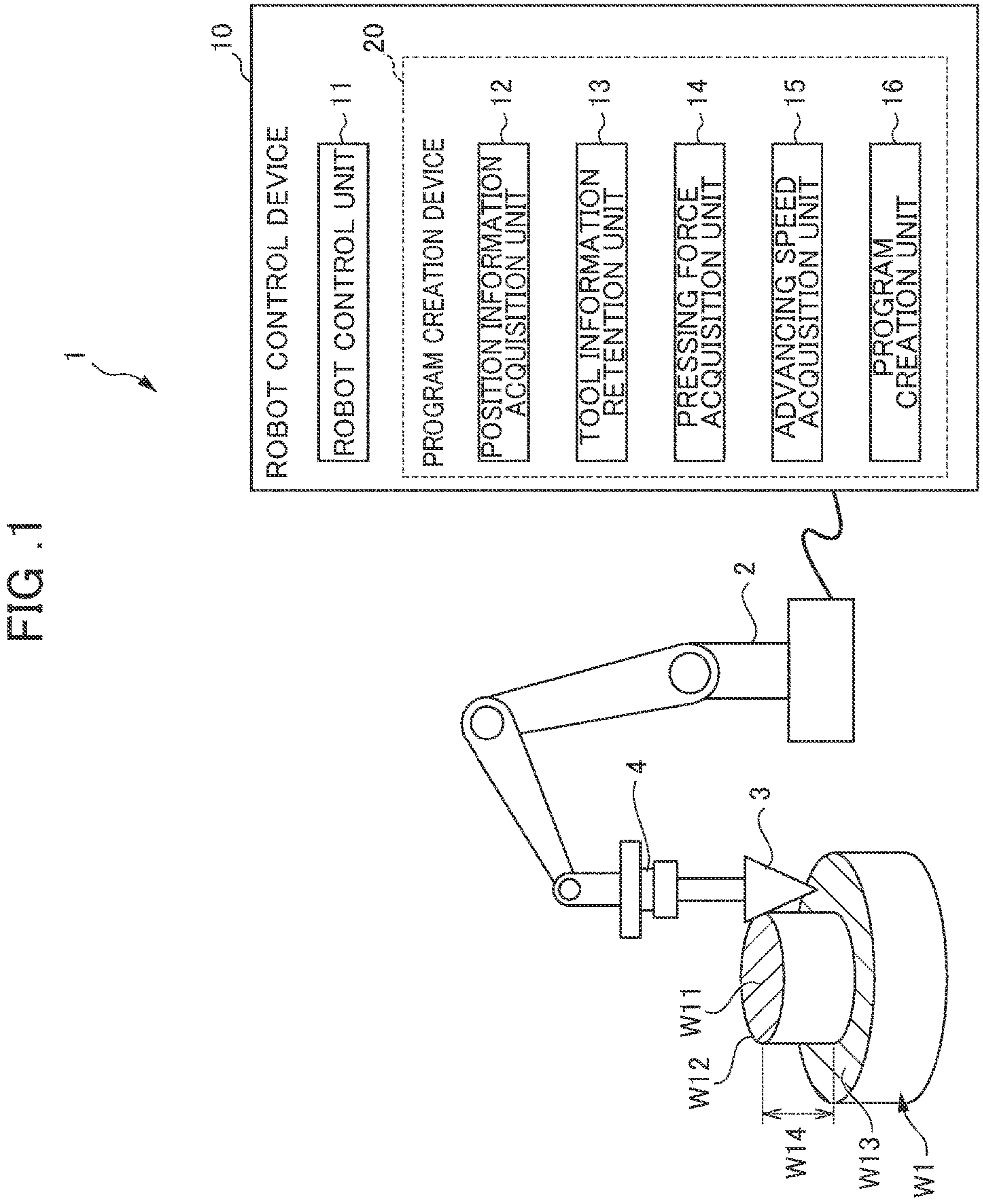
FIG. 1 is a schematic diagram showing a configuration of a deburring system including a program creation device according to an embodiment of the present disclosure.

Hereinafter, embodiments of the present disclosure will be described with reference to the drawings. FIG. 1 is a schematic diagram showing a configuration of a deburring system 1 including a program creation device 20 according to an embodiment of the present disclosure. The deburring system 1 is a system for deburring a workpiece W1.

The deburring system 1 of the present embodiment includes a robot 2, a deburring tool 3 held at the leading end of the robot 2, a force sensor 4 provided between the robot 2 and the deburring tool 3, a three-dimensional visual sensor 5 (see FIG. 12), and a robot control device 10 for controlling the robot 2. The program creation device 20 constitutes part of the robot control device 10.

A vertical articulated robot is typically used as the robot 2, but the present invention is not limited thereto. A scalar robot, a parallel link robot, an orthogonal coordinate robot, or the like may be used.

As the deburring tool 3, for example, a grinder, a reamer, or the like can be used. The shape of the deburring tool 3 may be selected from, for example, a cylindrical shape, a tapered shape, a bullet shape, and a conical shape, as appropriate. This will be described later.

The force sensor 4 measures three-axis force and torque. That is, the force sensor 4 can detect a force acting on the deburring tool 3 as a three-dimensional vector.

The three-dimensional visual sensor 5 detects and acquires a level difference W14 between a machined surface W11 and a reference surface W13 of the workpiece W1.

The robot control device 10 controls the deburring of removing burrs from the workpiece W1 by moving the deburring tool 3 along the ridge line of the workpiece W1 by the robot 2. Deburring is an example of removal machining. Another example is chamfering.

The robot control device 10 according to the present embodiment includes a robot control unit 11, a position information acquisition unit 12, a tool information retention unit 13, a pressing force acquisition unit 14, an advancing speed acquisition unit 15, and a program creation unit 16. The position information acquisition unit 12, the tool information retention unit 13, the pressing force acquisition unit 14, the advancing speed acquisition unit 15, and the program creation unit 16 constitute the program creation device 20.

The robot control device 10 can be implemented by introducing an appropriate operation program into one or more computer devices including a CPU, a memory, and so on. The components of the robot control device 10 described above are ones that fall under categorized functions of the robot control device 10, and do not need to be clearly distinguishable in terms of physical structure or program structure. The robot control device 10 may also include additional components that implement other functions.

The robot control unit 11 operates the robot 2 according to the teaching data to move the deburring tool 3 along the ridge line of the workpiece W1.

The position information acquisition unit 12 acquires a positional relationship (for example, a level difference as the amount of displacement) between the machined surface W11 and the reference surface W13 of the workpiece W1.

Specifically, the level difference is calculated from shape information (CAD information or the like) of the workpiece W1 or detected using a three-dimensional visual sensor.

The tool information retention unit 13 retains information such as the shape of the deburring tool 3. The shape is a concept including size. Specifically, as described later, the tool information retention unit 13 retains, with regard to the deburring tool 3 of each shape, a length L1 along the axis from a tool middle part 3C to a tool tip 3E, a length L2 along the axis from a tip part 3D to the tool tip 3E, a length L4 perpendicular to the axis from the tool middle part 3C to a tool rear end 3A, a length L5 perpendicular to the axis from a tool rear part 3B to the tool rear end 3A, and the like. The tool information retention unit 13 calculates and retains, with regard to the deburring tool 3 of each shape, a vertical component L3 of the length L1 along the axis from the tool middle part 3C to the tool tip 3E, a horizontal component L6 of the length L4 perpendicular to the axis from the tool middle part 3C to the tool rear end 3A, and the like, according to the inclination of the pose of the deburring tool 3.

The pressing force acquisition unit 14 acquires a pressing force of the deburring tool 3 against the workpiece W1. The pressing force acquired by the pressing force acquisition unit 14 is preferably vector data including direction information. As an example, the pressing force acquisition unit 14 may be configured to acquire the pressing force of the deburring tool 3 from the force sensor 4 provided in the robot 1.

The advancing speed acquisition unit 15 acquires the advancing speed of the deburring tool 3 advanced by the robot 2. The advancing speed acquisition unit 15 may be configured to acquire the advancing speed of the deburring tool 3 advanced by the robot 2, for example, from the robot control unit 11.

The program creation unit 16 creates an operation program for the robot control unit 11 to operate the robot 2 based on information such as the position information acquired by the position information acquisition unit 12, the tool information retained by the tool information retention unit 13, the pressing force acquired by the pressing force acquisition unit 14, and the advancing speed acquired by the advancing speed acquisition unit 15. The program creation unit 16 will be described later.

Figure 2A:
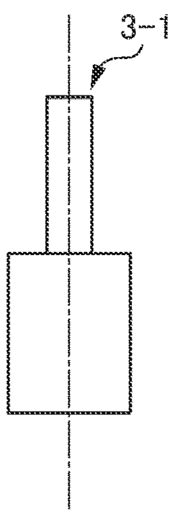
FIG. 2A is a schematic diagram showing an example of a deburring tool used in the deburring system of FIG. 1.
Figure 2B:
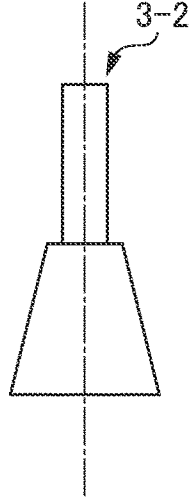
FIG. 2B is a schematic diagram showing an example of a deburring tool used in the deburring system of FIG. 1.

FIGS. 2A to 2D show the types of shapes of the deburring tool 3. FIG. 2A shows a cylindrical deburring tool 3-1, FIG.

Figure 2C:
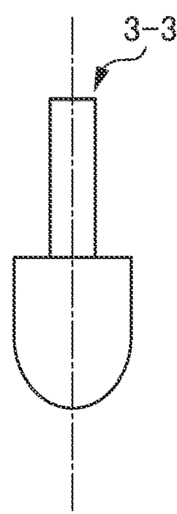
FIG. 2C is a schematic diagram showing an example of a deburring tool used in the deburring system of FIG. 1.
Figure 2D:
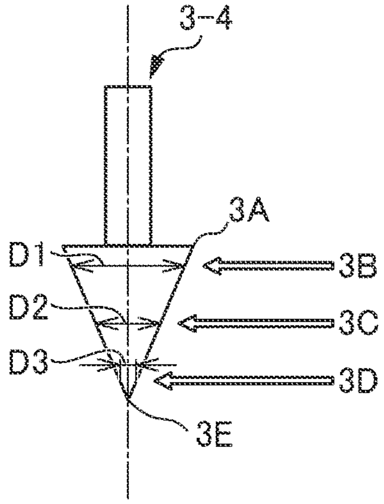
FIG. 2D is a schematic diagram showing an example of a deburring tool used in the deburring system of FIG. 1.

2B shows a tapered deburring tool 3-2, FIG. 2C shows a bullet-type deburring tool 3-3, and FIG. 2D shows a conical deburring tool 3-4.

Although the deburring tool 3 will be described using the conical deburring tool 3-4 exemplified in the following embodiments, the other deburring tools 3-1 to 3-3 can be similarly described. The deburring tool 3 has three areas from the root toward the tip in the axial direction, i.e., the tool rear part 3B that is close to the tool rear end 3A, the tool middle part 3C that is an intermediate part of the tool, and the tool tip part 3D that is close to the tool tip 3E. The tool rear part 3B has a diameter D1, the tool middle part 3C has a diameter D2, and the tool tip part 3D has a diameter D3. Normally, deburring is performed using the tool middle part 3C.

With reference to FIGS. 3 to 6, the deburring of a workpiece W1 of a first type will be described. The workpiece W1 has a machined surface W11 and a reference surface (for example, a casting surface) W13 displaced from the machined surface W11. Specifically, the machined surface W11 having a ridge line W12 is parallel to the reference surface (for example, the casting surface) W13, and protrudes from the reference surface W13 by the level difference W14.

The deburring of such a workpiece W1 having the level difference is normally performed as follows with the operation program of a standard type 1 created by the program creation unit 16 in which the tool middle part 3C of the deburring tool 3 is used as a use part.

Figure 3:
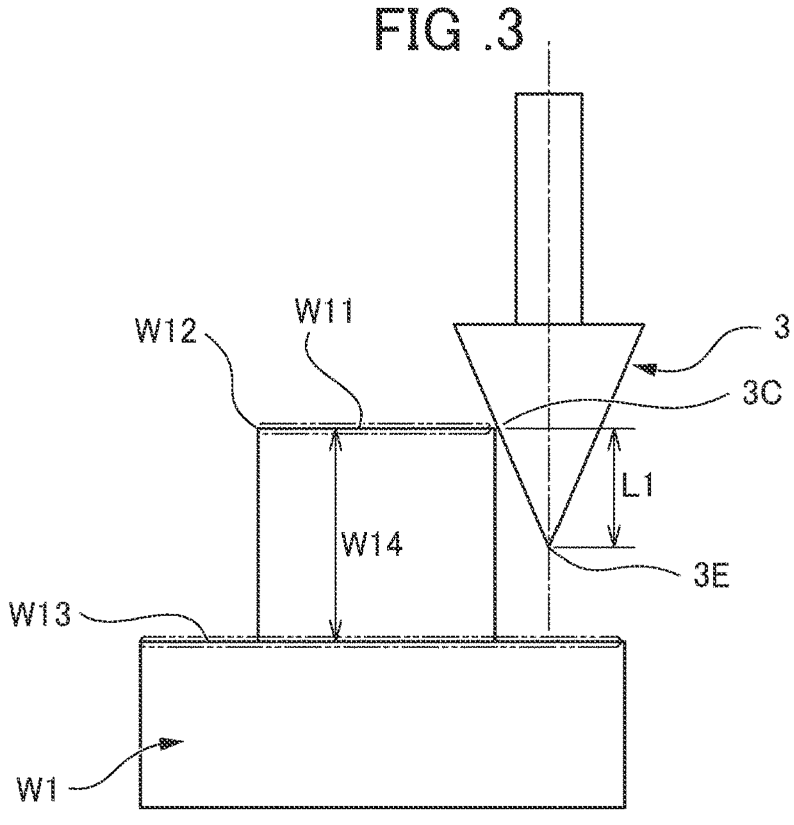
FIG. 3 is a schematic diagram showing the positional relationship between a deburring tool and a workpiece when the machined surface and the reference surface of the workpiece are parallel to each other and a sufficient level difference exists between the machined surface and the reference surface of the workpiece.

Specifically, as shown in FIG. 3, the pose of the deburring tool 3 is maintained such that the axis of the deburring tool 3 (for example, the conical deburring tool 3-4) is perpendicular to the machined surface W11 of the workpiece W1. The tool middle part 3C of the deburring tool 3 is brought into contact with the ridge line W12 of the machined surface W11. While the deburring tool 3 is rotated around the axis, the deburring tool 3 is advanced around the machined surface W11 along the ridge line W12 of the machined surface W11.

However, in such deburring, the workpiece W1 needs to have a sufficient level difference W14 (W14>L1) that exceeds the length L1 along the axis from the tool middle part 3C to the tool tip 3E of the deburring tool 3.

Figure 4:
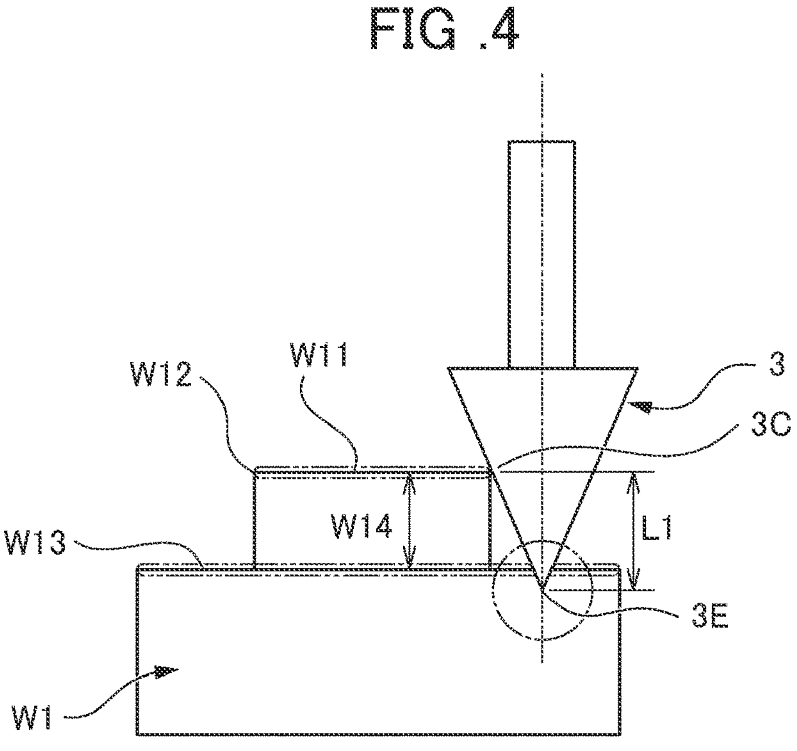
FIG. 4 is a schematic diagram showing that interference between the deburring tool and the workpiece occurs when no sufficient level difference exists between the machined surface and the reference surface of the workpiece of FIG. 3.

As shown in FIG. 4, when the level difference W14 of the workpiece W1 is smaller than the length L1 along the axis from the tool middle part 3C to the tool tip 3E (W14<L1), the tool tip 3E of the deburring tool 3 interferes with the reference surface W13. Therefore, with the operation program of the standard type 1, deburring cannot be performed.

Figure 5:
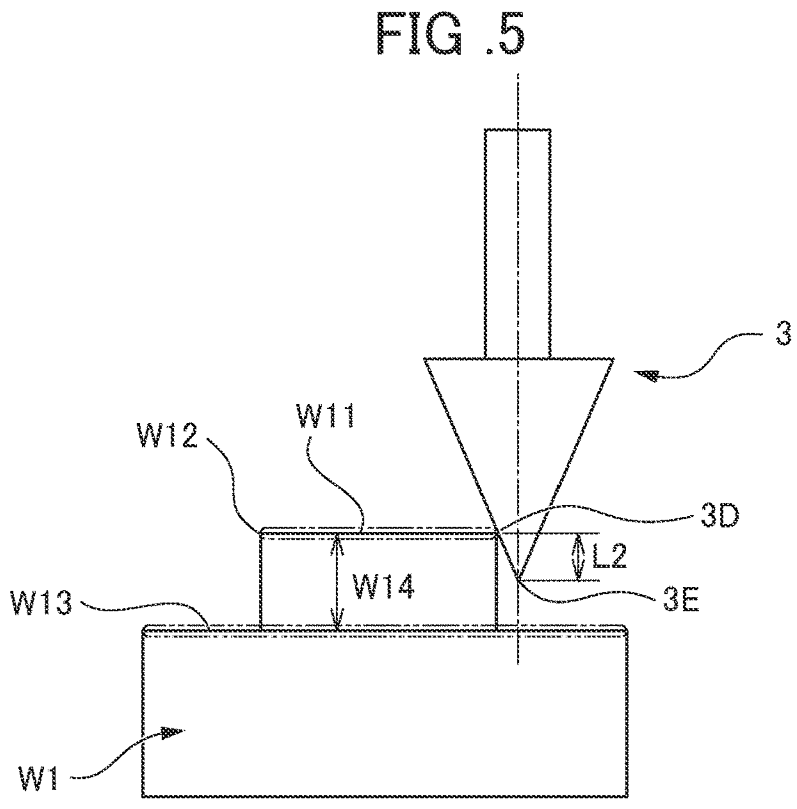
FIG. 5 is a schematic diagram showing an example for avoiding interference between the deburring tool and the workpiece when no sufficient level difference exists between the machined surface and the reference surface of the workpiece of FIG. 3.

In such a case, a first example for avoiding interference between the deburring tool 3 and the workpiece W1 is shown in FIG. 5. In FIG. 5, deburring is performed as follows with the operation program of a tip part use type created by the program creation unit 16 in which the tool tip part 3D of the deburring tool 3 is used as a use part.

Specifically, as shown in FIG. 5, the pose of the deburring tool 3 is maintained such that the axis of the deburring tool 3 is perpendicular to the machined surface W11 of the workpiece W1. The tool tip part 3D of the deburring tool 3 is brought into contact with the ridge line W12 of the machined surface W11. While the deburring tool 3 is rotated around the axis, the deburring tool 3 is advanced around the machined surface W11 along the ridge line W12 of the machined surface W11.

Thus, even when the length L2 along the axis from the tool tip part 3D to the tool tip 3E of the deburring tool 3 is shorter than the level difference W14 (W14>L2), deburring can be performed.

Figure 6:
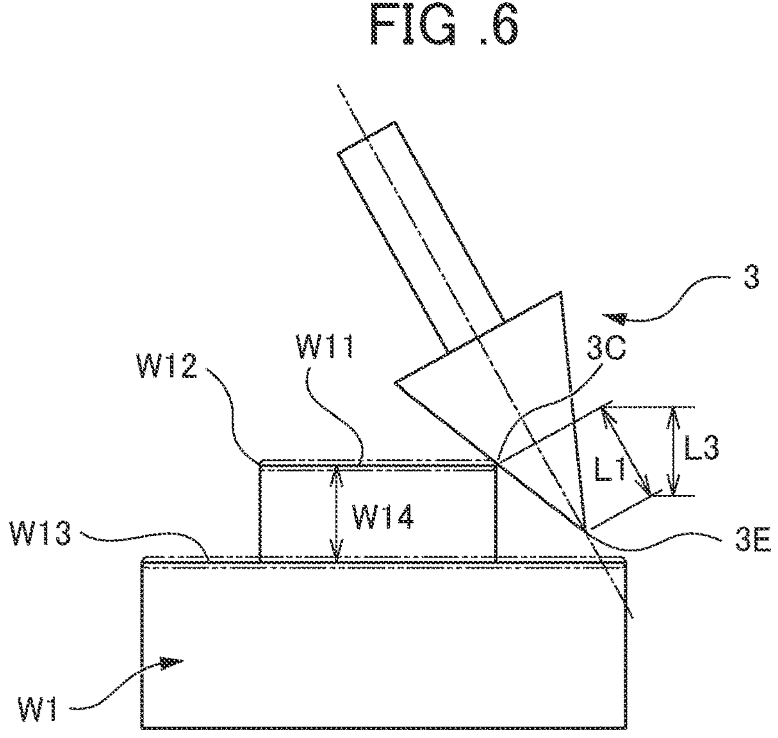
FIG. 6 is a schematic diagram showing another example for avoiding interference between the deburring tool and the workpiece when no sufficient level difference exists between the machined surface and the reference surface of the workpiece of FIG. 3.

A second example for avoiding interference between the deburring tool 3 and the workpiece W1 is shown in FIG. 6. In FIG. 6, deburring is performed in the following manner with the operation program of an inclination type 1 created by the program creation unit 16 in which the direction of the axis of the deburring tool 3 is inclined and the tool middle part 3C of the deburring tool 3 is used as a use part.

Specifically, as shown in FIG. 6, the pose of the deburring tool 3 is maintained such that the axis of the deburring tool 3 is inclined from a direction perpendicular to the machined surface W11 of the workpiece W1. The tool middle part 3C of the deburring tool 3 is brought into contact with the ridge line W12 of the machined surface W11. While the deburring tool 3 is rotated around the axis, the deburring tool 3 is advanced around the machined surface W11 along the ridge line W12 of the machined surface W11.

Thus, even when the vertical component L3 of the length L1 along the axis from the tool middle part 3C to the tool tip 3E of the deburring tool 3 is shorter than the level difference W14 (W14>L3), deburring can be performed.

A third example for avoiding interference between the deburring tool 3 and the workpiece W1 will be described. By replacing the deburring tool 3 with a smaller deburring tool 3 whose length along the axis from the tool middle part 3C to the tool tip 3E is shorter than the level difference W14, deburring can be performed. Such a tool is, for example, the deburring tool 3 shown on the right side of FIG. 17.

With reference to FIGS. 7 to 10, the deburring of a workpiece W2 of a second type will be described. The workpiece W2 has a machined surface W21 and a reference surface (for example, a casting surface) W23 displaced from the machined surface W21. Specifically, the machined surface W21 is perpendicular to the reference surface (for example, the casting surface) W23, and the ridge line W22 of the machined surface W21 protrudes from the reference surface W23 by a level difference W24.

The deburring of such a workpiece W2 having the level difference is normally performed as follows with the operation program of a standard type 2 created by the program creation unit 16 in which the tool middle part 3C of the deburring tool 3 is used as a use part.

Figure 7:
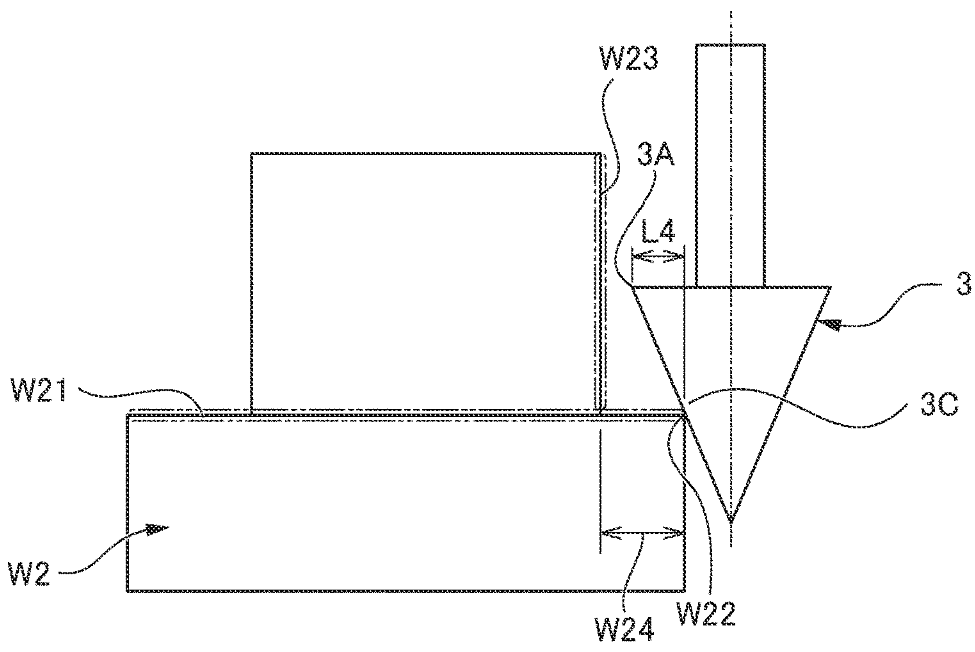
FIG. 7 is a schematic diagram showing the positional relationship between a deburring tool and a workpiece when the machined surface and the reference surface of the workpiece are perpendicular to each other and there is a sufficient level difference between the ridge line of the machined surface and the reference surface of the workpiece.

Specifically, as shown in FIG. 7, the pose of the deburring tool 3 (for example, the conical deburring tool 3-4) is maintained such that the axis of the deburring tool 3 is perpendicular to the machined surface W21 of the workpiece W2. The tool middle part 3C of the deburring tool 3 is brought into contact with the ridge line W22 of the machined surface W21. While the deburring tool 3 is rotated around the axis, the deburring tool 3 is advanced around the machined surface W21 along the ridge line W22 of the machined surface W21.

However, in such deburring, it is necessary for the workpiece W1 to have a sufficient level difference W24 (W24>L4) that exceeds the length L4 perpendicular to the axis from the tool middle part 3C to the tool rear end 3A of the deburring tool 3.

Figure 8:
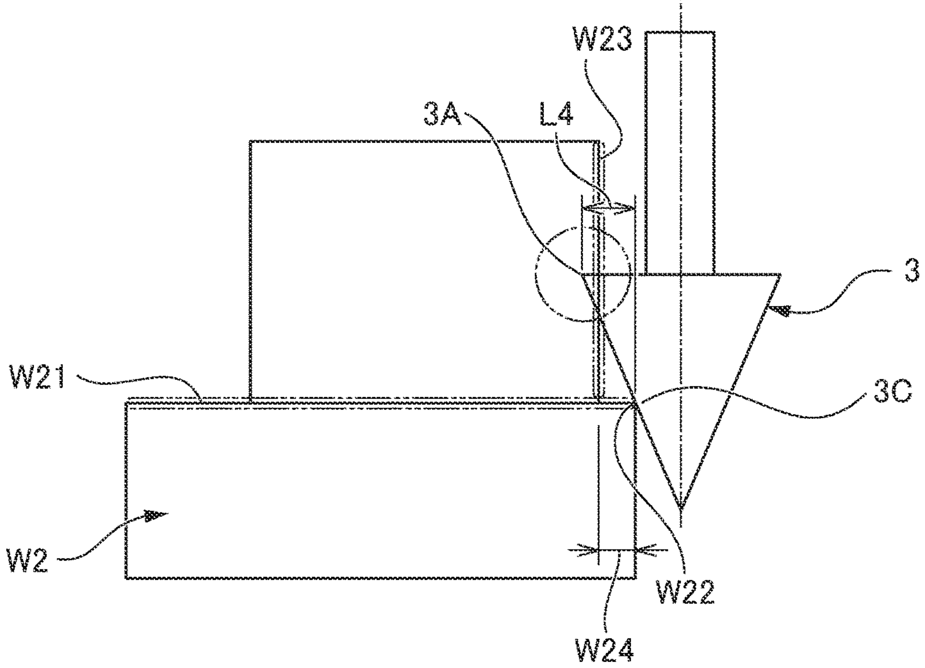
FIG. 8 is a schematic diagram showing that interference occurs between the deburring tool and the workpiece when there is no sufficient level difference between the machined surface and the reference surface of the workpiece of FIG. 7.

As shown in FIG. 8, when the level difference W24 of the workpiece W2 is smaller than the length L4 perpendicular to the axis from the tool middle part 3C to the tool rear end 3A (W24<L4), the tool rear end 3A of the deburring tool 3 interferes with the reference surface W23. Therefore, with the operation program of the standard type 2, deburring cannot be performed.

Figure 9:
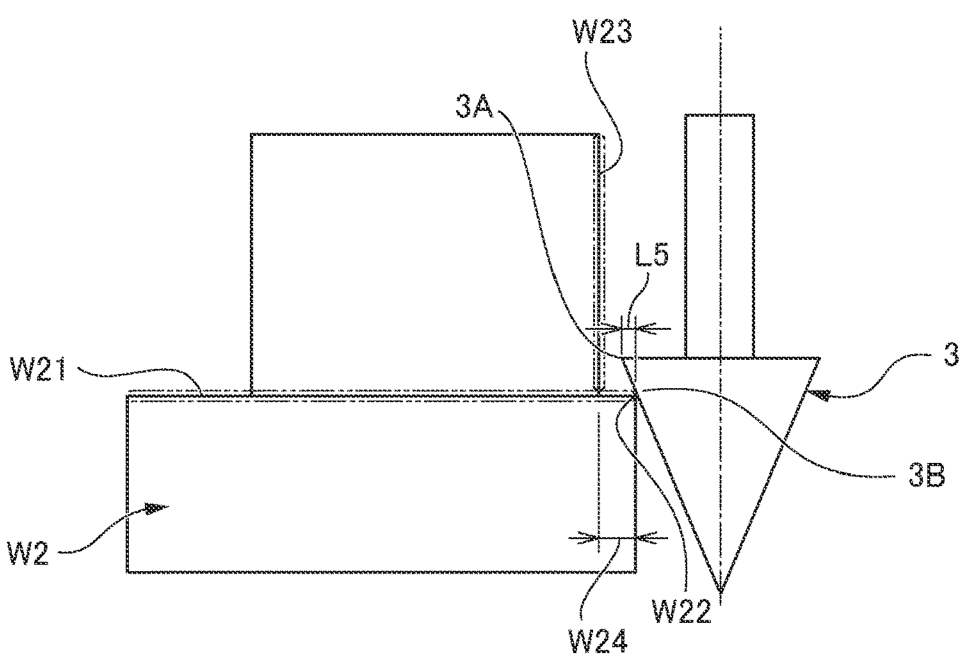
FIG. 9 is a schematic diagram showing an example for avoiding interference between the deburring tool and the workpiece when there is no sufficient level difference between the machined surface and the reference surface of the workpiece of FIG. 7.

In such a case, a first example for avoiding interference between the deburring tool 3 and the workpiece W2 is shown in FIG. 9. In FIG. 9, deburring is performed as follows with the operation program of a rear part use type created by the program creation unit 16 in which the tool rear part 3B of the deburring tool 3 is used as a use part.

Specifically, as shown in FIG. 9, the pose of the deburring tool 3 is maintained such that the axis of the deburring tool 3 is perpendicular to the machined surface W21 of the workpiece W2. The tool rear part 3B of the deburring tool 3 is brought into contact with the ridge line W22 of the machined surface W21. While the deburring tool 3 is rotated around the axis, the deburring tool 3 is advanced around the machined surface W21 along the ridge line W22 of the machined surface W21.

Thus, even when the length L5 perpendicular to the axis from the tool rear part 3B to the tool rear end 3A of the deburring tool 3 is shorter than the level difference W24 (W24>L5), deburring can be performed.

Figure 10:
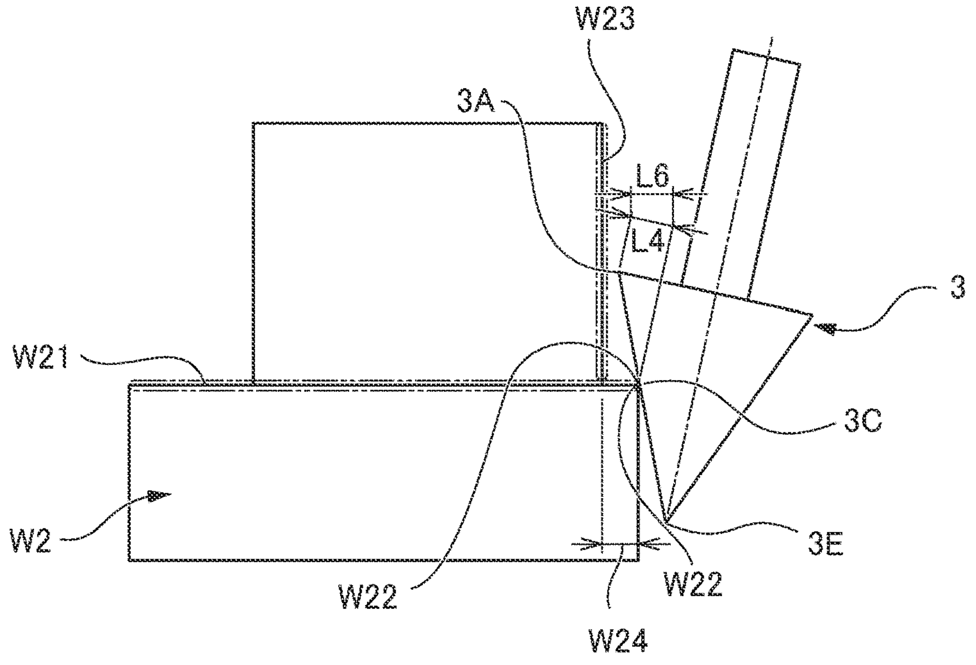
FIG. 10 is a schematic diagram showing another example for avoiding interference between the deburring tool and the workpiece when there is no sufficient level difference between the machined surface and the reference surface of the workpiece of FIG. 7.

A second example for avoiding interference between the deburring tool 3 and the workpiece W2 is shown in FIG. 10. In FIG. 10, deburring is performed in the following manner with the operation program of an inclination type 2 created by the program creation unit 16 in which the direction of the axis of the deburring tool 3 is inclined and the tool middle part 3C of the deburring tool 3 is used as a use part.

Specifically, as shown in FIG. 10, the pose of the deburring tool 3 is maintained such that the axis of the deburring tool 3 is inclined from a direction perpendicular to the machined surface W21 of the workpiece W2. The tool middle part 3C of the deburring tool 3 is brought into contact with the ridge line W22 of the machined surface W21. While the deburring tool 3 is rotated around the axis, the deburring tool 3 is advanced around the machined surface W21 along the ridge line W22 of the machined surface W21.

Thus, even when the horizontal component L6 of the length L4 perpendicular to the axis from the tool middle part 3C to the tool rear end 3A of the deburring tool 3 is shorter than the level difference W24 (W24>L6), deburring can be performed.

A third example for avoiding interference between the deburring tool 3 and the workpiece W2 will be described. By replacing the deburring tool 3 with a smaller deburring tool 3 whose length perpendicular to the axis from the tool middle part 3C to the tool rear end 3A is shorter than the level difference W24, deburring can be performed. Such a tool is, for example, the deburring tool 3 shown on the right side of FIG. 17.

Figure 11:
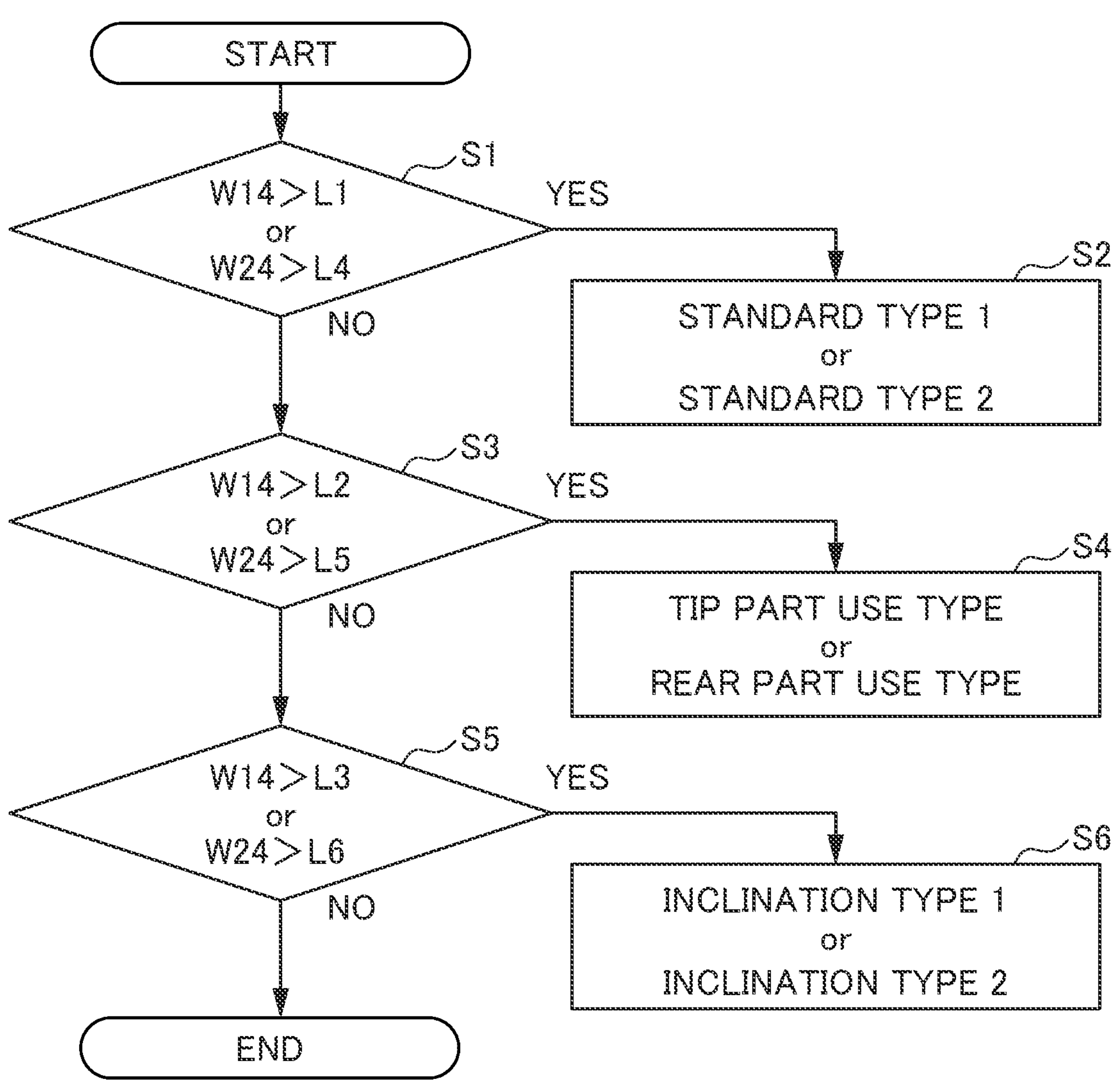
FIG. 11 is a flowchart relating to creation of an operation program for avoiding interference between a deburring tool and a workpiece when there is no sufficient level difference between the machined surface and the reference surface of the workpiece.

The program creation unit 16 creates the operation programs of the respective types described above. The creation includes modifications and changes of an existing operation program. FIG. 11 is a flowchart relating to creation of an operation program by the program creation unit 16. The program creation unit 16 determines whether the operation program is the standard type 1, the tip part use type, or the inclination type 1; or whether the operation program is the standard type 2, the rear part use type, or the inclination type 2, according to the extent of the level difference of the workpiece.

Specifically, as shown in FIG. 11, in the case of the workpiece W1, the program creation unit 16 sequentially determines whether W14>L1, W14>L2, or W14>L3 is true, based on the level difference W14 and the length L1 along the axis from the tool middle part 3C to the tool tip 3E of the deburring tool 3, the length L2 along the axis from the tip part 3D to the tool tip 3E, and the vertical component L3 of the length L1 along the axis from the tool middle part 3C to the tool tip 3E.

In the case of the workpiece W2, the program creation unit 16 sequentially determines whether W24>L4, W24>L5, or W24>L6 is true, based on the level difference W24 and the length L4 perpendicular to the axis from the tool middle part 3C to the tool rear end 3A of the deburring tool 3, the length L5 perpendicular to the axis from the tool rear part 3B to the tool rear end 3A, and the horizontal component L6 of the length L4 perpendicular to the axis from the tool middle part 3C to the tool rear end 3A.

In Step S1 of FIG. 11, the program creation unit 16 determines whether W14>L1 or W24>L4 is true, and in the case of YES, the processing advances to Step S2. In Step S2, the operation of the standard type 1 or the standard type 2 is performed. In the case of NO, the processing advances to Step S3.

In Step S3, the program creation unit 16 determines whether W14>L2 or W24>L5 is true, and in the case of YES, the processing advances to Step S4. In Step S4, the operation of the tip part use type or the rear part use type is performed. In the case of NO, the processing advances to Step S5.

In Step S5, the program creation unit 16 determines whether W14>L3 or W24>L6 is true, and in the case of YES, the processing advances to Step S6. In Step S6, the operation of the inclination type 1 or the inclination type 2 is performed. In the case of NO, the processing ends.

In the present disclosure, when a protrusion is detected on the reference surface of the workpiece in the shape information of the workpiece or the position information acquired by the three-dimensional visual sensor, the position information acquisition unit 12 may acquire, by calculation, a portion where removal machining is impossible or difficult on the machined surface of the workpiece due to the protrusion. The details will be described below.

Figure 12:
FIG. 12 is a schematic diagram showing detection of a level difference between the machined surface and the reference surface of a workpiece by using a three-dimensional visual sensor.
Figure 12:
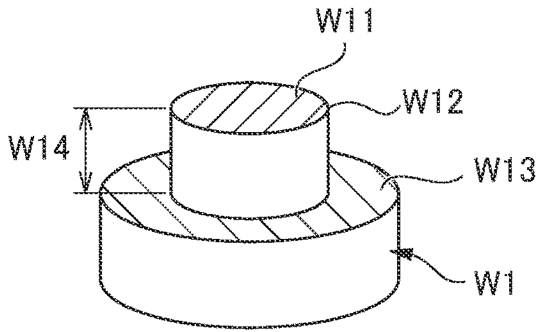

An example of a method of detecting a level difference of a workpiece will be described. As shown in FIG. 12, the presence or absence of the level difference W14 of the workpiece W1 and the dimension of the level difference W14 are detected by using the three-dimensional visual sensor 5. Alternatively, the presence or absence of the level difference W14 of the workpiece W1 and the dimension of the level difference W14 may be calculated from the shape information (CAD information) of the workpiece W1. The same applies to the level difference W24 of the workpiece W2.

Figure 13:
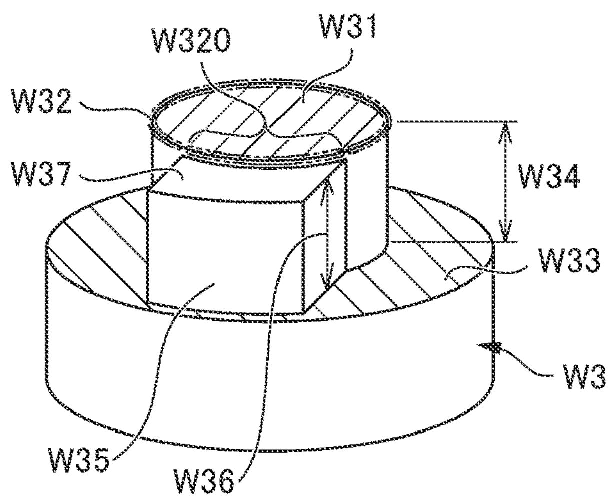
FIG. 13 is a schematic diagram showing a portion that cannot be deburred based on the detected level difference.

FIG. 13 shows a workpiece W3 of a third type. The workpiece W3 has a machined surface W31 and a reference surface (for example, a casting surface) W33 displaced from the machined surface W31. Specifically, the machined surface W31 having a ridge line W32 is parallel to the reference surface (for example, the casting surface) W33, and protrudes from the reference surface W33 by a level difference W34.

The workpiece W3 further has a protrusion W35 protruding from the reference surface W33. The protrusion W35 protrudes from the reference surface W33 by a height W36. The protrusion height W36 of the protrusion W35 approximates the level difference W34 between the machined surface W31 and the reference surface W33. That is, in the ridge line W32 of the machined surface W31, there is almost no level difference between a portion W320, which is adjacent to the protrusion W35, and an upper surface (protruding surface) W37 of the protrusion W35.

Therefore, in the case of the workpiece W3, the portion W320 of the ridge line W32, adjacent to the protrusion W35, out of the ridge line W32 that spans the entire circumference of the machined surface W31, cannot be deburred. On the other hand, the remaining ridge line W32 except for the portion W320 can be deburred by the deburring tool 3. The portion W320 of the ridge line W32 adjacent to the protrusion W35 is an example of "a portion where removal machining is impossible or difficult on the machined surface of the workpiece due to the protrusion".

As shown in FIG. 12, the presence or absence of such a portion where deburring is impossible can also be detected by using the three-dimensional visual sensor 5. Alternatively, the presence or absence of a portion of the workpiece W3 where deburring is impossible may be calculated from the shape information (CAD information) of the workpiece W3.

The deburring of the workpiece W1 having such a portion where deburring is impossible, is performed only on the portion where deburring is possible, with the operation program of the standard type 1 created by the program creation unit 16 in which the tool middle part 3C of the deburring tool 3 is used as a use part, for example, as shown in FIG. 3.

When a portion where removal machining is difficult is acquired in the machining area of the machined surface corresponding to the protruding surface of the protrusion having a second amount of displacement, between the machined surface and the protruding surface of the protrusion parallel to the reference surface of the workpiece, because the second amount of displacement is smaller than a first amount of displacement between the machined surface and the reference surface of the workpiece, the program creation unit 16 may change the use part of the removal machining tool 3, the pose of the removal machining tool 3, or the shape of the removal machining tool 3 on the portion where removal machining is difficult, depending on the size of the difference between the first amount of displacement and the second amount of displacement. The details will be described below.

Figure 14:
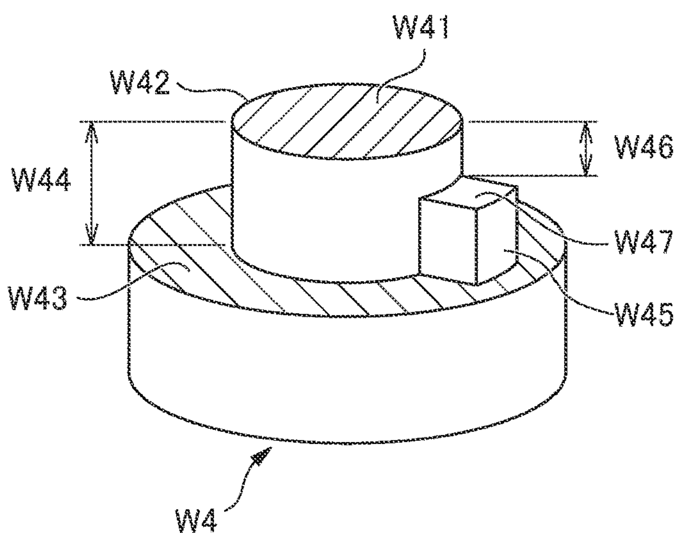
FIG. 14 is a schematic diagram showing a workpiece when a protrusion or the like is present in part of a level difference.

FIG. 14 shows a workpiece W4 of a fourth type. The workpiece W4 has a machined surface W41 and a reference surface (for example, a casting surface) W43 displaced from the machined surface W41, and further has a protrusion W45 protruding from the reference surface W43. Unlike the workpiece W3 of FIG. 13, the workpiece W4 has a level difference W46 between an upper surface (protruding surface) W47 of the protrusion W45 and the machined surface W41. The level difference W46 is smaller than a level difference W44 between the machined surface W41 and the reference surface W43 (W46<W44). "W46<W44" is an example of "the second amount of displacement between the machined surface and the protruding surface of the protrusion parallel to the reference surface of the workpiece is smaller than the first amount of displacement between the machined surface and the reference surface of the workpiece". The "protruding surface W47 of the protrusion W45" is an example of "the protruding surface of the protrusion having the second amount of displacement".

Figure 15:
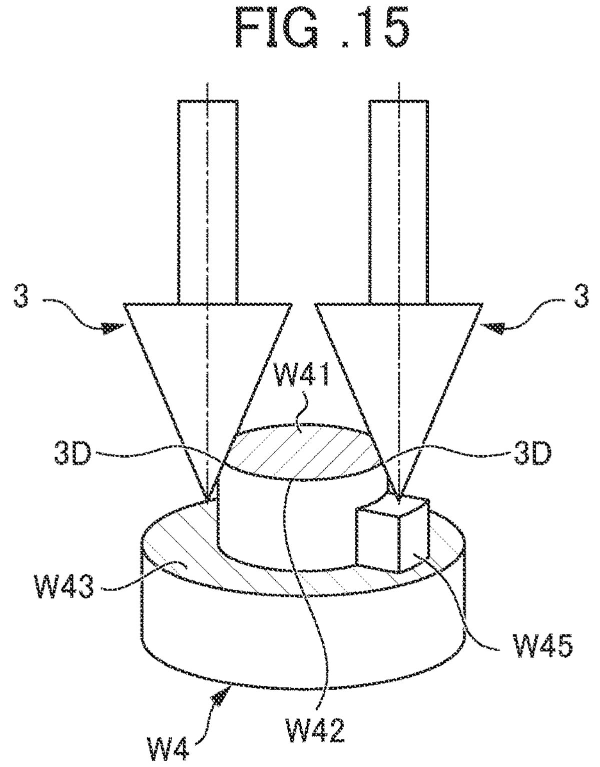
FIG. 15 is a schematic diagram showing a first example for deburring the workpiece of FIG. 14.

With reference to FIGS. 15 to 19, the deburring of the workpiece W4 of the fourth type will be described. As shown in FIG. 15, in the deburring of the workpiece W4 according to a first embodiment, the same use part of the deburring tool 3 is selected for all portions of the ridge line W42 based on the smallest level difference (in this case, the level difference W46 of the portion of the protrusion W45).

The deburring of the workpiece W4 according to the first embodiment is performed as follows with the operation program of the tip part use type created by the program creation unit 16 in which the tool tip part 3D of the deburring tool 3 is used as a use part.

Specifically, to prevent the deburring tool 3 shown on the right side of FIG. 15 from interfering with the protrusion W45, according to the example of FIG. 5, the pose of the deburring tool 3 is maintained such that the axis of the deburring tool 3 is perpendicular to the machined surface W41 of the workpiece W4. The tool tip part 3D of the deburring tool 3 is brought into contact with the ridge line W42 of the machined surface W41. While the deburring tool 3 is rotated around the axis, the deburring tool 3 is advanced around the machined surface W41 along the ridge line W42 of the machined surface W41. Thus, the entire ridge line W42 can be deburred using one deburring tool 3.

Figure 16:
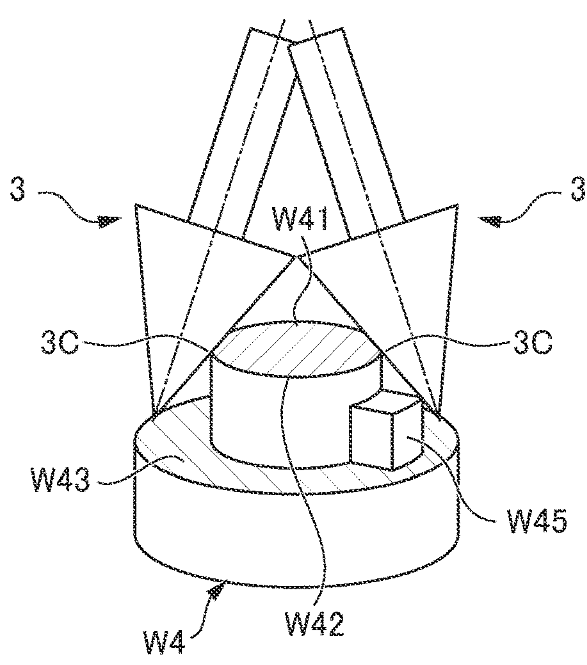
FIG. 16 is a schematic diagram showing a second example for deburring the workpiece of FIG. 14.

As shown in FIG. 16, in the deburring of the workpiece W4 according to a second embodiment, the same tool pose is selected based on the smallest level difference (in this case, the level difference W46 of the portion of the protrusion W45).

The deburring of the workpiece W4 according to the second embodiment is performed as follows with the operation program of the inclination type 1 created by the program creation unit 16 in which the direction of the axis of the deburring tool 3 is inclined and the tool middle part 3C of the deburring tool 3 is used as a use part.

Specifically, to prevent the deburring tool 3 shown on the right side of FIG. 16 from interfering with the protrusion W45, according to the example of FIG. 6, the pose of the deburring tool 3 is maintained such that the axis of the deburring tool 3 is inclined from a direction perpendicular to the machined surface W41 of the workpiece W4. The tool middle part 3C of the deburring tool 3 is brought into contact with the ridge line W42 of the machined surface W41. While the deburring tool 3 is rotated around the axis, the deburring tool 3 is advanced around the machined surface W41 along the ridge line W42 of the machined surface W41. Thus, the entire ridge line W42 can be deburred using one deburring tool 3.

Figure 17:
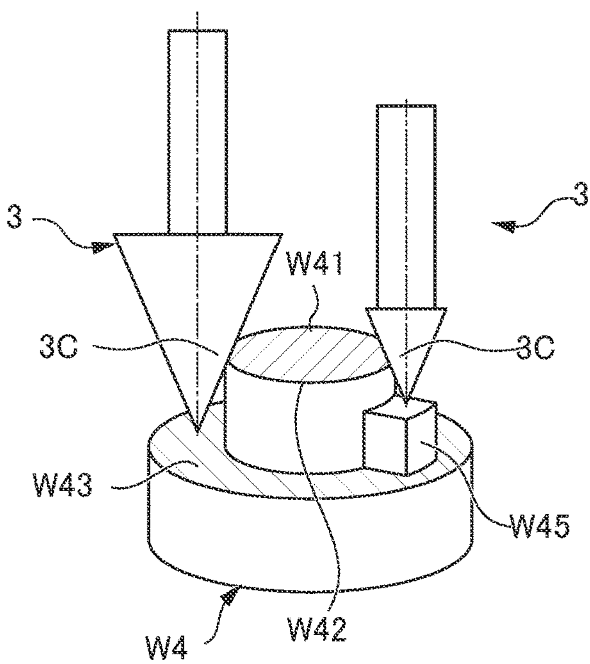
FIG. 17 is a schematic diagram showing a third example for deburring the workpiece of FIG. 14.

As shown in FIG. 17, in the deburring of the workpiece W4 according to a third embodiment, a relatively small deburring tool 3 is selected for a portion with a small level difference (in this case, the level difference W46 of the portion of the protrusion W45), and a relatively large deburring tool 3 is selected for a portion with a large level difference (in this case, the level difference W44 of the portion other than the protrusion W45).

The deburring of the workpiece W4 according to the third embodiment is performed as follows with the operation program of the standard type 1 created by the program creation unit 16 in which the tool middle part 3C of the deburring tool 3 is used as a use part.

Specifically, to prevent the deburring tool 3 shown on the right side of FIG. 17 from interfering with the protrusion W45, the relatively small deburring tool 3 is used for the portion with the small level difference. According to the example of FIG. 3, the pose of the deburring tool 3 is maintained such that the axis of the deburring tool 3 is perpendicular to the machined surface W41 of the workpiece W4. The tool middle part 3C of the deburring tool 3 is brought into contact with the ridge line W42 of the machined surface W41. While the deburring tool 3 is rotated around the axis, the deburring tool 3 is advanced along a part (the portion with the small level difference) of the perimeter of the machined surface W41 along the ridge line W42 of the machined surface W41.

The relatively large deburring tool 3 is used for the portion with the large level difference shown on the left side of FIG. 17. According to the example of FIG. 3, the pose of the deburring tool 3 is maintained such that the axis of the deburring tool 3 is perpendicular to the machined surface W41 of the workpiece W4. The tool middle part 3C of the deburring tool 3 is brought into contact with the ridge line W42 of the machined surface W41. While the deburring tool 3 is rotated around the axis, the deburring tool 3 is advanced along the remainder (the portion with the large level difference) of the perimeter of the machined surface W41 along the ridge line W42 of the machined surface W41.

Figure 18:
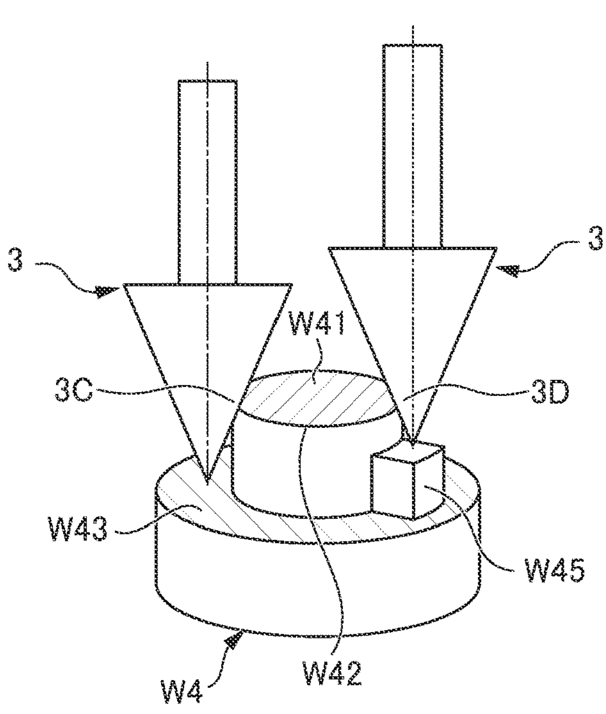
FIG. 18 is a schematic diagram showing a fourth example for deburring the workpiece of FIG. 14.

As shown in FIG. 18, in the deburring of the workpiece W4 according to a fourth embodiment, the tip part 3D of the deburring tool 3 is selected for the portion with the small level difference (in this case, the level difference W46 of the portion of the protrusion W45), and the middle part 3C of the deburring tool 3 is selected for the portion with the large level difference (in this case, the level difference W44 of the portion other than the protrusion W45).

With regard to the deburring of the workpiece W4 according to the fourth embodiment, the deburring of the portion with the small level difference is performed with the operation program of the tip part use type created by the program creation unit 16 in which the tool tip part 3D of the deburring tool 3 is used as a use part, and the deburring of the portion with the large level difference is performed with the operation program of the standard type 1 created by the program creation unit 16 in which the tool middle part 3C of the deburring tool 3 is used as a use part, in the following manner.

Specifically, to prevent the deburring tool 3 shown on the right side of FIG. 18 from interfering with the protrusion W45, according to the example of FIG. 5, in the portion with the small level difference, the pose of the deburring tool 3 is maintained such that the axis of the deburring tool 3 is perpendicular to the machined surface W41 of the workpiece W4. The tool tip part 3D of the deburring tool 3 is brought into contact with the ridge line W42 of the machined surface W41. While the deburring tool 3 is rotated around the axis, the deburring tool 3 is advanced along a part (the portion with the small level difference) of the perimeter of the machined surface W41 along the ridge line W42 of the machined surface W41.

In the portion with the large level difference shown on the left side of FIG. 18, according to the example of FIG. 3, the pose of the deburring tool 3 is maintained such that the axis of the deburring tool 3 is perpendicular to the machined surface W41 of the workpiece W4. The tool middle part 3C of the deburring tool 3 is brought into contact with the ridge line W42 of the machined surface W41. While the deburring tool 3 is rotated around the axis, the deburring tool 3 is advanced along the remainder (the portion with the large level difference) of the perimeter of the machined surface W41 along the ridge line W42 of the machined surface W41.

Figure 19:
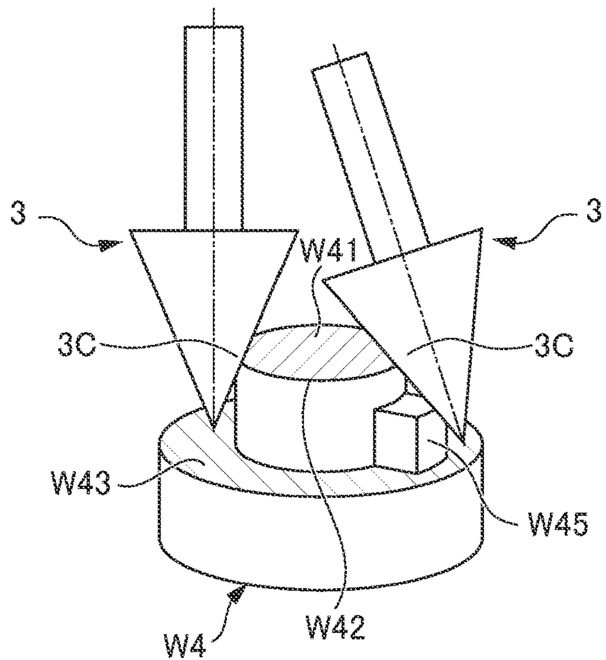
FIG. 19 is a schematic diagram showing a fifth example for deburring the workpiece of FIG. 14.

As shown in FIG. 19, in the deburring of the workpiece W4 according to the fifth embodiment, a different pose is selected for the deburring tool for each of the portion with the small level difference (in this case, the level difference W46 of the portion of the protrusion W45) and the portion with the large level difference (in this case, the level difference W44 of the portion other than the protrusion W45).

The deburring of the workpiece W4 according to the fifth embodiment is performed on the portion with the small level difference with the operation program of the inclination type 1 created by the program creation unit 16 in which the direction of the axis of the deburring tool 3 is inclined and the tool middle part 3C of the deburring tool 3 is used as a use part, and performed on the portion with the large level difference with the operation program of the standard type 1 created by the program creation unit 16 in which the tool middle part 3C of the deburring tool 3 is used as a use part, in the following manner.

Specifically, to prevent the deburring tool 3 shown on the right side of FIG. 19 from interfering with the protrusion W45, according to the example of FIG. 6, in the portion with the small level difference, the pose of the deburring tool 3 is maintained such that the axis of the deburring tool 3 is inclined from a direction perpendicular to the machined surface W41 of the workpiece W4. The tool middle part 3C of the deburring tool 3 is brought into contact with the ridge line W42 of the machined surface W41. While the deburring tool 3 is rotated around the axis, the deburring tool 3 is advanced along a part (the portion with the small level difference) of the perimeter of the machined surface W41 along the ridge line W42 of the machined surface W41.

In the portion with the large level difference shown on the left side of FIG. 19, according to the example of FIG. 3, the pose of the deburring tool 3 is maintained such that the axis of the deburring tool 3 is perpendicular to the machined surface W41 of the workpiece W4. The tool middle part 3C of the deburring tool 3 is brought into contact with the ridge line W42 of the machined surface W41. While the deburring tool 3 is rotated around the axis, the deburring tool 3 is advanced along the remainder (the portion with the large level difference) of the perimeter of the machined surface W41 along the ridge line W42 of the machined surface W41.

In the present disclosure, when the use part or the shape of the removal machining tool 3 is changed in the machining area of the machined surface corresponding to the protruding surface of the protrusion having the second amount of displacement, the program creation unit 16 may adjust the advancing speed and the pressing force of the robot 2 for removal machining in the machining area and the advancing speed and the pressing force of the robot 2 for removal machining in the remaining machining area excluding the machining area so as to obtain a uniform machining depth in the entire machining area of the machined surface. The details will be described below.

Figure 20:
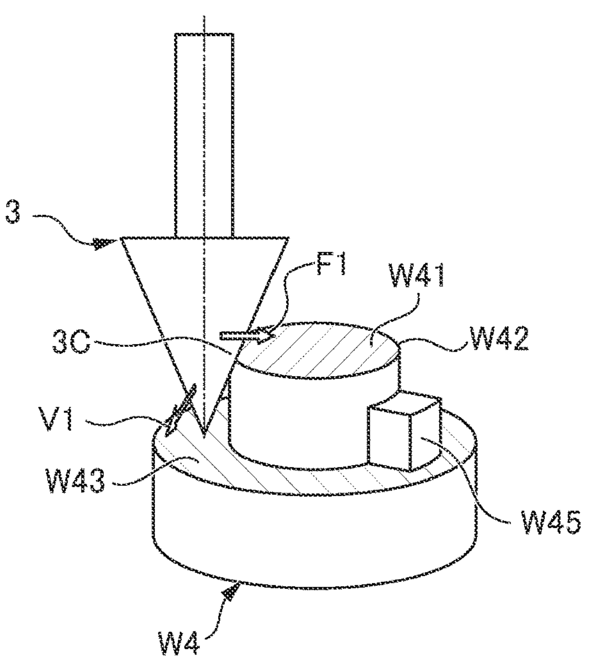
FIG. 20 is a schematic diagram showing a first part in a case where the use part of a deburring tool is changed for deburring the workpiece of FIG. 14.
Figure 21:
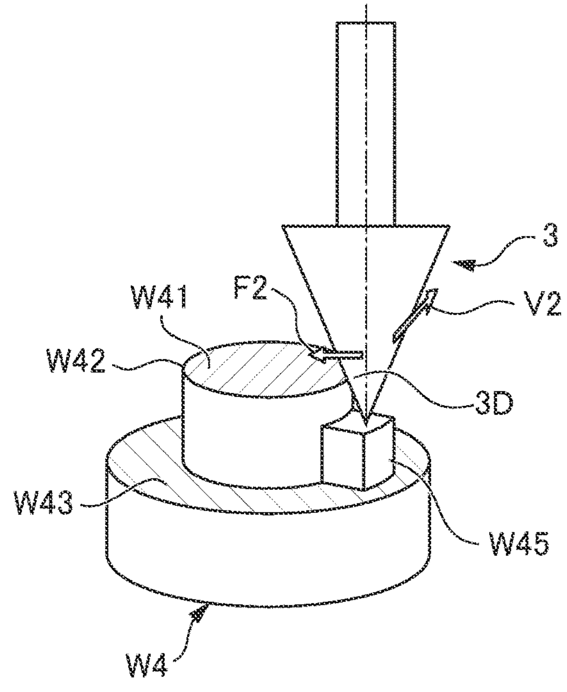
FIG. 21 is a schematic diagram showing a second part in a case where the use part of the deburring tool is changed for deburring the workpiece of FIG. 14.

With reference to FIGS. 20 and 21, for example, as shown in FIG. 18, when the use part of one deburring tool 3 is changed, adjustment of the advancing speed (V1, V2) or the pressing force (F1, F2) of the deburring tool 3 by the robot 2 will be described.

The program creation unit 16 performs adjustment in the following manner based on the information of the advancing speeds (V1, V2) of the deburring tool 3 acquired from the advancing speed acquisition unit 15 and the information of the pressing forces (F1, F2) of the deburring tool 3 against the workpiece acquired from the pressing force acquisition unit 14.

FIG. 20 shows the deburring tool 3 when the portion with the large level difference as shown on the left side of FIG. 18 is machined. The use part of the deburring tool 3 is the middle part 3C, and therefore, the operation program of the standard type 1 is used as a base. The advancing speed of the deburring tool 3 advanced by the robot 2 is V1, and the pressing force of the deburring tool 3 pressed by the robot 2 is F1. This state is applied to all portions other than the protrusion W45.

FIG. 21 shows the deburring tool 3 when the portion with the small level difference as shown on the right side of FIG. 18 is machined. The use part of the deburring tool 3 is the tip part 3D, and therefore, the operation program of the tip part use type is used as a base. The advancing speed of the deburring tool 3 advanced by the robot 2 is V2, and the pressing force of the deburring tool 3 pressed by the robot 2 is F2. This state is applied only to the ridge line W42 of the workpiece W4 corresponding to the portion between both ends of the protruding surface W47 of the protrusion W45. The "ridge line W42 of the workpiece W4 corresponding to the portion between both ends of the protruding surface W47 of the protrusion W45" is an example of "the machining area of the machined surface corresponding to the protruding surface of the protrusion having the second amount of displacement".

The diameter D2 (see FIG. 2) of the middle part 3C, which is the use part of the deburring tool 3 of FIG. 20, is larger than the diameter D3 (see FIG. 2) of the tip part 3D, which is the use part of the deburring tool 3 of FIG. 21 (D2>D3), and therefore, the circumferential length of the middle part 3C is longer than the circumferential length of the tip part 3D.

When the deburring tool 3 is rotating at a constant speed around the axis, the tip part 3D of the deburring tool 3 shown in FIG. 21 rotates once while the middle part 3C of the deburring tool 3 shown in FIG. 20 rotates once. Therefore, during one rotation of the deburring tool 3, the length of contact of the middle part 3C with the ridge line W42 of the workpiece W4 is longer than the length of contact of the tip part 3D with the ridge line W42 of the workpiece W4. In other words, the amount of machining with the middle part 3C of the deburring tool 3 is larger than that with the tip part 3D.

Accordingly, the program creation unit 16 adjusts the advancing speed (V1, V2) or the pressing force (F1, F2) of the deburring tool 3 by the robot 2 so that the amount of machining becomes uniform between the case where the middle part 3C of the deburring tool 3 is used and the case where the tip part 3D is used.

Specifically, for example, when the pressing force F1 of the deburring tool 3 pressed by the robot 2 in the case where the middle part 3C of the deburring tool 3 is used is equal to the pressing force F2 of the deburring tool 3 pressed by the robot 2 in the case where the tip part 3D of the deburring tool 3 is used (F1=F2), the program creation unit 16 makes the advancing speed V1 of the deburring tool 3 advanced by the robot 2 in the case where the middle part 3C of the deburring tool 3 is used greater than the advancing speed V2 of the deburring tool 3 advanced by the robot 2 in the case where the tip part 3D of the deburring tool 3 is used (V1>V2).

When the advancing speed V1 of the deburring tool 3 advanced by the robot 2 in the case where the middle part 3C of the deburring tool 3 is used is equal to the advancing speed V2 of the deburring tool 3 advanced by the robot 2 in the case where the tip part 3D of the deburring tool 3 is used (V1=V2), the program creation unit 16 makes the pressing force F1 of the deburring tool 3 pressed by the robot 2 in the case where the middle part 3C of the deburring tool 3 is used smaller than the pressing force F2 of the deburring tool 3 pressed by the robot 2 in the case where the tip part 3D of the deburring tool 3 is used (F1<F2).

In the embodiments of FIGS. 15 to 19, the workpiece W4 of the fourth type shown in FIG. 14 has been described. The workpiece W4 of the fourth type is obtained by adding the protrusion W45 to the workpiece W1 of the first type shown in FIGS. 1 and 3. However, as in the embodiments of FIGS. 15 to 19, various embodiments can be considered for a workpiece of a type in which a protrusion is added to the workpiece W2 of the second type shown in FIG. 7.

In such a type of workpiece, in adjustment of the advancing speed (V1, V2) or the pressing force (F1, F2) of the deburring tool 3 by the robot 2 when the use part of one deburring tool 3 is changed, it is needless to say that the relationship (D2<D1) between the diameter D2 of the middle part 3C that is one use part of the deburring tool 3 and the diameter D1 (see FIG. 2) of the rear part 3B that is the other use part of the deburring tool 3 is used.

In each of the embodiments described above, the deburring of the workpiece has been described. However, the present invention can be similarly applied to any removal machining other than the deburring. The removal machining is typically removal machining by contact, such as cutting, grinding, or polishing.

EXPLANATION OF REFERENCE NUMERALS

1 deburring system
2 robot
3 deburring tool (removal machining tool)
4 force sensor
5 three-dimensional visual sensor
10 robot control device
11 robot control unit
12 position information acquisition unit
13 tool information retention unit
14 pressing force acquisition unit
15 advancing speed acquisition unit
16 program creation unit
20 program creation device
W1, W2, W3, W4 workpiece
W11, W21, W31, W41 machined surface
W13, W23, W33, W43 reference surface
W14, W24, W34, W44, W46 level difference
W35, W45 protrusion
W37, W47 protruding surface

The invention claimed is:

1. A program creation device for creating an operation program for a robot for removal machining of a workpiece having a machined surface and a reference surface displaced from the machined surface, the robot for removal machining comprising a removal machining tool, the program creation device comprising: a processor, and a memory, the processor being configured to acquire position information relating to a positional relationship between the machined surface and the reference surface of the workpiece, the memory being configured to retain tool information including shape information and pose information of the removal machining tool, the processor being configured to create the operation program for the robot for removal machining based on the position information of the workpiece and the tool information of the removal machining tool, and the processor being further configured to select a use part and a pose of the removal machining tool so as to avoid interference between the removal machining tool and the reference surface of the workpiece, wherein, when the workpiece has a protrusion protruding from the reference surface, and a portion where removal machining is difficult is included in a machining area of the machined surface corresponding to a protruding surface of the protrusion having a second amount of displacement between the machined surface of the workpiece and the protruding surface of the protrusion parallel to the reference surface because the second amount of displacement is smaller than a first amount of displacement between the machined surface and the reference surface of the workpiece, the processor changes the use part of the removal machining tool, pose of the removal machining tool, or shape of the removal machining tool, in the portion where removal machining is difficult, depending on a size of a difference between the first amount of displacement and the second amount of displacement.

2. The program creation device according to claim 1, wherein the positional relationship between the machined surface and the reference surface of the workpiece is acquired by calculation based on shape information of the workpiece or by detection by a three-dimensional visual sensor.

3. The program creation device according to claim 2, wherein, when the protrusion is detected on the reference surface of the workpiece in the shape information of the workpiece or the position information acquired by the three-dimensional visual sensor, the processor is configured to acquire, by calculation, a portion where removal machining is impossible or difficult on the machined surface of the workpiece due to the protrusion.

4. The program creation device according to claim 3, wherein the portion where removal machining is difficult is acquired by the calculation in a machining area of the machined surface corresponding to a protruding surface of the protrusion having a second amount of displacement.

5. The program creation device according to claim 1, wherein, when the use part or the shape of the removal machining tool is changed in the machining area of the machined surface corresponding to the protruding surface of the protrusion having the second amount of displacement, the processor is configured to adjust an advancing speed and a pressing force of the robot for removal machining in the machining area and an advancing speed and a pressing force of the robot for removal machining in a remaining machining area excluding the machining area so as to obtain a uniform machining depth in an entire machining area of the machined surface.

* * * * *